G. W. LEE.
Grain-Drill.
No. 11,967. Patented Nov. 21, 1854.
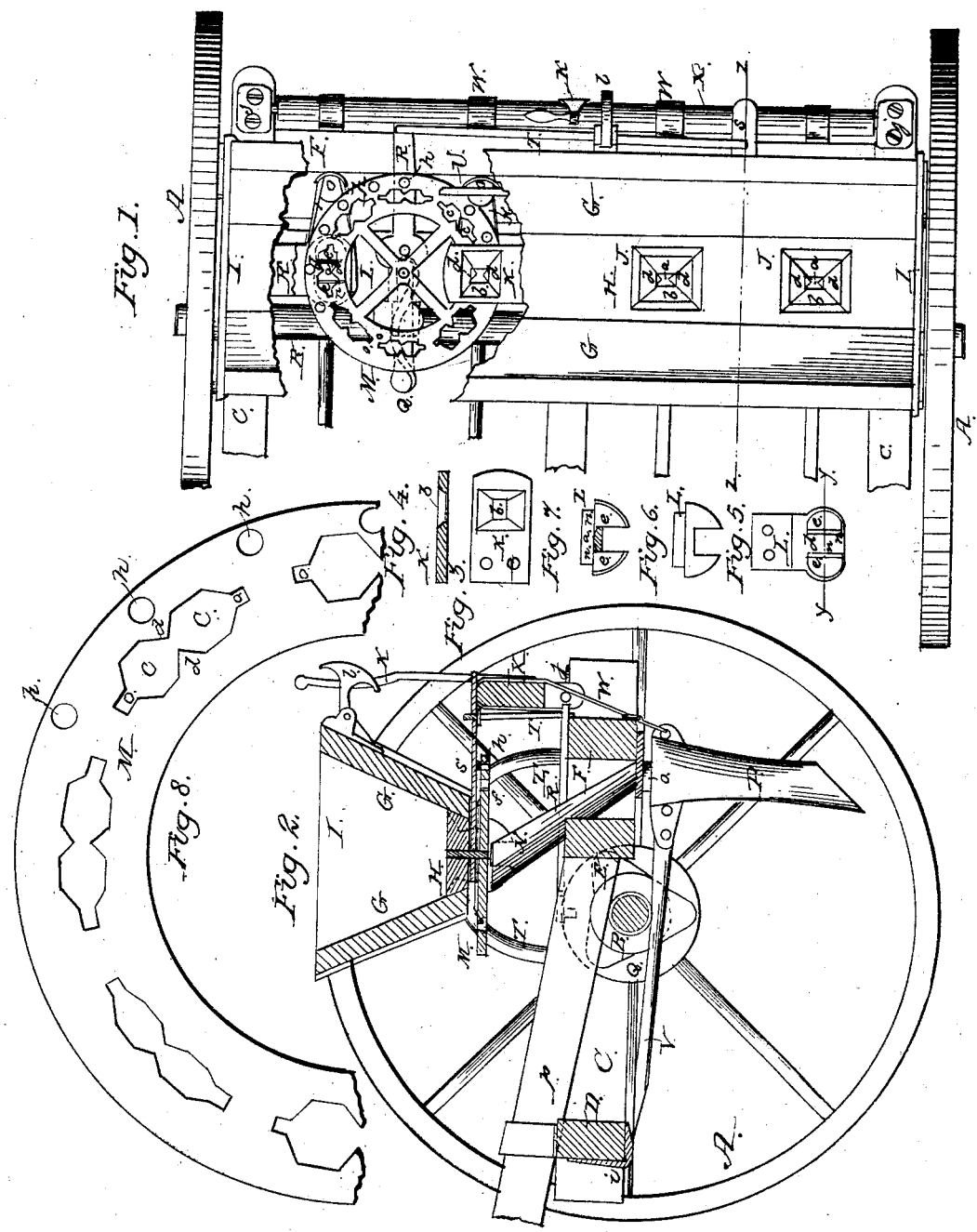

UNITED STATES PATENT OFFICE.

GEO. W. LEE, OF ERCILDOWN, PENNSYLVANIA.

IMPROVEMENT IN SEED-PLANTERS.

Specification forming part of Letters Patent No. 11,967, dated November 21, 1854.

*To all whom it may concern:*

Be it known that I, GEORGE W. LEE, of Ercildown, in the county of Chester and State of Pennsylvania, have invented certain new and useful Improvements in Machines for Drilling Grain and Seeds of Different Kinds; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan or top view, with the seed-box broken away to show one of the seeding-wheels. Fig. 2 is a sectional elevation through the line z z of Fig. 1. The other figures, from 3 to 8, inclusive, will be referred to in the description.

A A are two wheels, fitted to the axle B, one of which may be fastened to the axle and the other allowed to turn loose upon it. The axle B is fitted to turn loose in boxes fastened to the under side of the rails C C, which rails C C are connected together by the bars D E F, so as to form the frame of the carriage.

G G are the sides of the seed-box, and H the bottom, supported by the ends I I, which ends are fastened to the rails C C. The bottom H of the seed-box is provided with a series of holes, J J, enlarged at the top. Immediately beneath each of these holes a plate, K, is fastened, (see Figs. 3 and 4,) the latter being a section of the former cut through the center lengthwise.

The plate K is provided with a hopper-shaped hole, b, to facilitate the passage of the seed and permit it to pass down onto the plate L. (See Fig. 5, which is a plan; Fig. 6, an elevation; Fig. 7, a section of Fig. 5 cut through the line y y.) The plate L is fastened directly under the plate K, so that the bar a is directly below the hole b, and the plate L is bent down, so as to leave a space for the edge of the vibrating disk M, which is made in the form represented. (See a section of a full-sized disk, Fig. 8.)

The holes c c in the disk M are made of different sizes, so as to drill different kinds or quantities of grain, and are provided with projections d d, which sweep the grain from the bar a into the openings e e, from which openings it falls into the spout N and passes down into the tube O, which conducts it into the drilling-tooth P, which deposits it in the ground. The disks M M vibrate upon pivots which turn in holes made in the bottom of the seed-box for that purpose, and are operated by the cam Q upon the axle B, which cam vibrates the lever R upon a screw in the bar E, which lever R is connected to the lever S, which vibrates upon the pivot of the disk M, by the rod T.

The lever S is provided with a pin, f, fitted to the holes h h in the disks M, and the disks are connected together by the rod V, which is provided with a pivot at each end fitted to the holes h h in the disks.

The drilling-teeth P may be made in the form represented or otherwise, and fastened to the rod V, which rod is hinged to the bar D by stands i.

The drilling-teeth are raised by the straps W, fastened to them and to the bar X, which bar vibrates upon the pivoted stands j j, fastened to the rail C, and is operated by the hand-lever k and fastened up in the position represented, so as to hold up the teeth P, by the hook l, fastened to the seed-box. When the box X is turned up it raises the lever S and lifts the pin f out of the hole h, so that it ceases to vibrate the disks and to deliver seed, as the scores n n in the bar a of the plate L prevent the seed from rolling off of the bar a, even if the bar is inclined to a limited extent, until the disks M are put in motion again. By this arrangement the teeth are raised and the seed stopped at once whenever the operator desires it. The holes c c are gradually narrowed toward their extremities, and terminate in the scores o o, as represented, so as to save the grain from being cut between the ends of the holes c c and the edges of the hole b, and wasted, as it might do, if they were constructed otherwise. If there were a bar across the hole c c instead of the points d d, the seed or grain would be cut to pieces between the edges of such bar and the edges of the hole b; but as the points d d in the disk form an angle of about forty-five degrees with the edges of the hole b these angles press or crowd the seed toward the space between the points, so that they escape being cut either by passing under the plate k or passing through between the points d d. As the openings c c are gradually reduced toward each end by angles similar to those above mentioned and terminate in the scores o o, the seed passes into the scores or escapes above the plate K as the machine is operated in drilling the seed.

It will be apparent that machines may be built with such a number of disks and with such a number of holes in each disk as may be desirable, and that the disks may be connected by a series of rods like the rod U, and in drilling angular pieces of land they may be removed in succession, so as to allow the disks to stop in succession as required, and by using a cam more or less curved, or with a greater or less number of curves, more or less seed can be drilled to the acre; or if one or both of the pins in the lever R, which are acted upon by the cam Q, are fitted to slots in the lever R and provided with screw-nuts, they may be set nearer together or farther apart, so as to vary the quantity of seed drilled to an acre.

$p$ is the section of a tongue to which the team may be harnessed to draw the machine.

I am aware that numerous machines for drilling grain and seed have been patented; but those which have the best reputation are defective in some or all of the following particulars—that is, they discharge more grain when the box or hopper is full than when it is nearly empty. Neither will they drill the several kinds of grain required without changing the seed-box, slides, or other fixtures, or making some addition thereto.

With the use of my improvements the defects above enumerated are remedied, so as to discharge the same quantity of seed whether the box is full or nearly empty. It will also drill the several kinds of grain required, including oats, without additional fixtures of any kind, which no other machine will do that has been made heretofore. Besides, the scores $n$ $n$ prevent the seed from rolling off the bar $a$, so that the machine will drill as uniformly when going up or down hill as upon level land, which is a decided advantage that it possesses over all others.

I am aware that perforated disks with holes of various forms have long been in common use in seeding-machines. Therefore I make no claim to the disks, but only to the shape or form of the end of the hole in the disk, as above stated, for the purposes set forth.

What I claim as my invention, and desire to secure by Letters Patent, is—

The scores $o$ $o$ or their equivalents at the extremities of the holes $c$ in the disks M, in combination with the gradual narrowing of the holes toward their extremities, so as to save the grain from being cut between the ends of the hole $c$ and the edges of the hole $b$, substantially as described.

In testimony whereof I have hereunto signed my name before two subscribing witnesses.

GEORGE W. LEE.

Witnesses:
SAML. GRUBB,
I. F. WALLARD.